United States Patent
Kondo et al.

(10) Patent No.: US 7,880,854 B2
(45) Date of Patent: Feb. 1, 2011

(54) PANEL AND METHOD FOR MANUFACTURING THE SAME

(75) Inventors: Masahiko Kondo, Nara (JP); Shingo Jogan, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 422 days.

(21) Appl. No.: 11/813,534

(22) PCT Filed: Mar. 20, 2006

(86) PCT No.: PCT/JP2006/005588

§ 371 (c)(1),
(2), (4) Date: Jul. 9, 2007

(87) PCT Pub. No.: WO2006/098475

PCT Pub. Date: Sep. 21, 2006

(65) Prior Publication Data

US 2009/0303427 A1    Dec. 10, 2009

(30) Foreign Application Priority Data

Mar. 18, 2005    (JP)    ................. 2005-078656

(51) Int. Cl.
*G02F 1/1339*    (2006.01)
(52) U.S. Cl. ..................... 349/153; 349/190
(58) Field of Classification Search ........... None
See application file for complete search history.

(56) References Cited

U.S. PATENT DOCUMENTS

| | | | |
|---|---|---|---|
| 6,268,896 B1 * | 7/2001 | Takasaki et al. ............ 349/110 |
| 6,424,394 B1 * | 7/2002 | Morii ........................ 349/110 |
| 6,646,709 B2 | 11/2003 | Matsumoto | |
| 6,842,208 B2 | 1/2005 | Takasaki et al. | |
| 7,196,753 B2 | 3/2007 | Takasaki et al. | |
| 7,227,601 B2 | 6/2007 | Takasaki et al. | |
| 2001/0028425 A1 | 10/2001 | Takasaki et al. | |
| 2002/0167634 A1 | 11/2002 | Watanabe et al. | |
| 2002/0191141 A1 * | 12/2002 | Liao ........................ 349/155 |
| 2002/0196393 A1 * | 12/2002 | Tashiro et al. ............ 349/106 |
| 2003/0081155 A1 * | 5/2003 | Moon et al. .............. 349/106 |
| 2003/0218713 A1 | 11/2003 | Suzuki et al. | |
| 2004/0017526 A1 * | 1/2004 | Kuo ......................... 349/110 |

(Continued)

FOREIGN PATENT DOCUMENTS

EP    1076257 A2 *    2/2001

(Continued)

OTHER PUBLICATIONS

Official Communication for PCT Application No. PCT/JP2006/305588; mailed on Jun. 27, 2006.

*Primary Examiner*—Mike Stahl
(74) *Attorney, Agent, or Firm*—Keating & Bennett, LLP (57) ABSTRACT

A liquid crystal display panel includes a TFT substrate, a color filter (CF) substrate opposed to the TFT substrate, a sealant disposed between the TFT substrate and the CF substrate and disposed between portions of both the substrates located immediately outside display regions thereof, and a liquid crystal layer disposed between the TFT substrate and the CF substrate. The CF substrate is provided with a light-shielding layer at a portion located immediately outside its display region. The light-shielding layer is provided with a slit at a region that coincides with a line on the TFT substrate.

6 Claims, 7 Drawing Sheets

U.S. PATENT DOCUMENTS

| | | |
|---|---|---|
| 2004/0160566 A1 | 8/2004 | Kawabe et al. |
| 2005/0105019 A1 | 5/2005 | Takasaki et al. |
| 2005/0151920 A1 | 7/2005 | Watanabe et al. |
| 2006/0192910 A1 | 8/2006 | Takasaki et al. |
| 2008/0151172 A1* | 6/2008 | Kondo et al. ............... 349/153 |

FOREIGN PATENT DOCUMENTS

| | | | |
|---|---|---|---|
| JP | 06-194615 A | | 7/1994 |
| JP | 11-237621 A | * | 8/1999 |
| JP | 2000-056316 A | | 2/2000 |
| JP | 2002-040442 A | | 2/2002 |
| JP | 2002-202512 A | * | 7/2002 |
| JP | 2002-229040 A | | 8/2002 |
| JP | 2003-043462 A | | 2/2003 |
| JP | 2003-315810 A | | 11/2003 |
| JP | 2004-004563 A | | 1/2004 |
| JP | 2004-233648 A | | 8/2004 |

* cited by examiner

PANEL AND METHOD FOR MANUFACTURING THE SAME

BACKGROUND OF THE INVENTION

1. Field of the Invention

The present invention relates to panels and methods for manufacturing the same, and more particularly relates to liquid crystal panels formed with liquid crystal layers by a one-drop fill method.

2. Description of the Related Art

Process steps for manufacturing a liquid crystal panel include the process step of charging a liquid crystal material into a panel. Methods for charging a liquid crystal material into a panel include a dip method and a dispenser method. In these methods, the following technique is used: A pair of substrates are bonded to each other with a sealant interposed therebetween, then a liquid crystal material is charged through an opening of the sealant into a panel by utilizing capillarity and a differential pressure, and then the opening is sealed. However, with an increase in the screen size, the cycle time for charging a liquid crystal material into a panel is becoming longer.

In recent years, a one-drop fill method (alternatively, referred to as an ODF method or a drop bonding method) has been developed as another method for charging a liquid crystal material into the panel. In the one-drop fill method, while an opening is not formed in a seal pattern formed on one of a pair of substrates to be bonded to each other later, a liquid crystal material is dropped to the inside of the seal pattern, then the other substrate is superimposed on the substrate on which the seal pattern is placed to surround the liquid crystal material under a reduced pressure, and then a sealant is cured. Use of the one-drop fill method allows an increase in the screen size and a dramatic reduction in the cycle time for charging a liquid crystal material into a panel.

However, in the one-drop fill method, an uncured sealant has been in contact with a liquid crystal material until the sealant is cured, leading to the possibility of components of the sealant leaking into a liquid crystal layer. This may cause an unstable orientation of liquid crystal and cause spotting, unevenness and flicker, resulting in reduced display quality of a liquid crystal panel.

Techniques for preventing contact between an uncured sealant and a liquid crystal material in a one-drop fill method have been disclosed in Japanese Unexamined Patent Application Publication Nos. 6-194615; 2002-40442; 2003-315810; and 2004-233648. More particularly, these documents disclose that when a seal barrier is arranged to extend along the side of a sealant near a liquid crystal layer, this prevents contact between an uncured sealant and a liquid crystal material.

However, use of this method increases the number of process steps for forming a seal barrier, resulting in an increase in production cost.

Figures 7A, 7B, 7C:
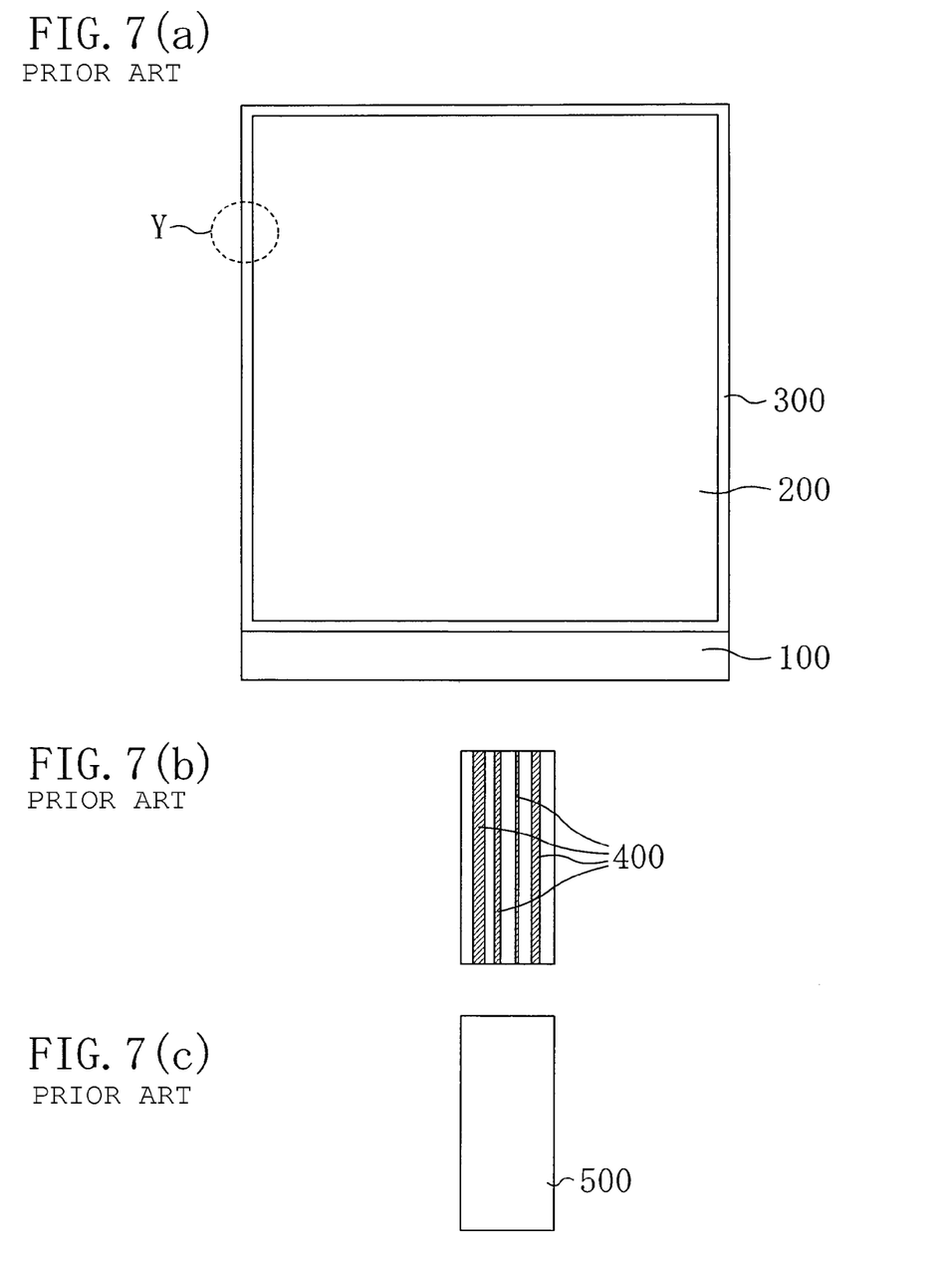
FIG. 7(a) is a plan view schematically illustrating a mobile liquid crystal panel.
FIG. 7(b) is a schematic enlarged view of a portion of a TFT substrate surrounded by Y in FIG. 7(a)
FIG. 7(c) is a schematic enlarged view of a portion of a color filter substrate surrounded by Y in FIG. 7(a).

Meanwhile, for a panel with a narrow frame, such as a mobile panel, a light-shielding layer (black matrix) is formed around a display region of the panel without being spaced apart from the edge of the display region in order to reduce the area of a non-display region of the panel as much as possible. FIG. 7(a) is a plan view schematically illustrating a mobile liquid crystal panel, FIG. 7(b) is a schematic enlarged view of a portion of a TFT (thin film transistor) substrate 100 surrounded by Y in FIG. 7(a), and FIG. 7(c) is a schematic enlarged view of a portion of a color filter substrate 200 surrounded by Y in FIG. 7(a). As illustrated in FIG. 7(c), the color filter substrate 200 is provided at its region corresponding to a sealant 300 with a black matrix 500. Therefore, the sealant 300 needs to be cured by applying light, e.g., ultraviolet light, through the TFT substrate 100, opposed to the color filter substrate 200, to the sealant 300.

Various lines 400 are formed on an end portion of the TFT substrate 100. For this reason, when light (ultraviolet light) is applied through the TFT substrate 100 to the sealant 300, the lines 400 shade the sealant 300 from the light so that the sealant 300 is partially prevented from sufficiently undergoing photopolymerization. In other words, since light (ultraviolet light) has conventionally been able to be applied only through the TFT substrate 100 to the sealant 300, the sealant 300 shaded from the light by the lines 400 for the TFT substrate 100 has not been able to be sufficiently cured. Therefore, use of the sealant 300 containing both a photocuring (ultraviolet-curing) agent and a thermal curing agent has had to achieve both ultraviolet curing and thermal curing of the sealant 300.

Meanwhile, once a decrease in the viscosity of the sealant 300 has been caused by the application of heat for thermal curing, curing will proceed, resulting in an increase in the viscosity thereof. In this process, the liquid crystal temperature increases and consequently exceeds the nematic-isotropic phase transition temperature (NI point). Therefore, before the sealant 300 is sufficiently cured, impurities in the sealant 300 may leak into a liquid crystal layer.

SUMMARY OF THE INVENTION

In order to overcome the problems described above, preferred embodiments of the present invention provide a liquid crystal panel which prevents any increase in the production cost thereof, reduces the size of an uncured portion of a sealant, and in which components of the sealant are less likely to leak into a liquid crystal layer, so as to ultimately ensure the reliability of liquid crystal panels while maintaining excellent display quality.

According to a preferred embodiment of the present invention, a light-shielding layer having a slit that is in a negative/positive relationship with a line on a first substrate is formed immediately outside a display region of a second substrate provided with a sealant. In this way, the problems described above are solved. More specifically, a panel according to a preferred embodiment of the present invention includes a first substrate, a second substrate opposed to the first substrate, and a sealant disposed between the first substrate and the second substrate and formed between portions of the first and second substrates located immediately outside the display region. At least the portion of the first substrate located immediately outside the display region is provided with lines exhibiting a light blocking effect. On the other hand, the portion of the second substrate located immediately outside the display region is provided with a light-shielding layer, and slits are formed in regions of the light shielding layer coinciding with the lines. According to the panel of various preferred embodiments of the present invention, the sealant can be cured by applying light through both sides of the panel. This can reduce the size of an uncured portion of the sealant.

The panel according to a preferred embodiment of the present invention may be a liquid crystal panel further including a liquid crystal layer provided between the first substrate and the second substrate. In the liquid crystal panel of a preferred embodiment of the present invention, the sealant may be in the form of a loop (closed frame) that does not have any opening for injecting a liquid crystal material into the panel. In other words, in the liquid crystal panel according to a preferred embodiment of the present invention, the liquid crystal layer may be formed by a one-drop fill method. Alternatively, the sealant may have an opening for injecting the liquid crystal material into the panel, and in this case, the liquid crystal material may be charged through the opening of the sealant into the panel by a dip method or a dispenser method.

The sealant is not limited to only a photopolymerized sealant cured by applying light, such as ultraviolet light, to the sealant. A combined use of photoreactive and heat-reactive sealant cured by both of photoirradiation and heating may be made. In other words, the sealant may be a composite containing not only a photocuring agent but also a thermal curing agent. However, impurities in an uncured sealant may leak into the liquid crystal layer by the heating for thermal curing, and therefore a photopolymerized sealant is more preferably used as the sealant than a photoreactive and heat-reactive sealant.

In particular, since light can be applied through both sides of the liquid crystal panel of various preferred embodiments of the present invention to the sealant, use of a photopolymerized sealant can shorten the sealant curing period and the period during which the liquid crystal layer is in contact with the uncured sealant. In view of this, in the liquid crystal panel according to preferred embodiments of the present invention, the possibility of components of the sealant leaking into the liquid crystal layer is further reduced. As a result, the display quality of the panel can be maintained with higher reliability.

The liquid crystal panel according to preferred embodiments of the present invention may further include a barrier formed inside the sealant and extending along the sealant. In this case, the surface of the barrier near the sealant may be inclined. Since this liquid crystal panel has a barrier formed inside the sealant (on the side of the sealant near the liquid crystal layer), this can prevent components of the uncured sealant from being in contact with the liquid crystal layer during the period from the bonding between the first and second substrates to the curing of the sealant. Furthermore, since the surface of the barrier near the sealant is inclined, the area of contact between the barrier and the sealant becomes larger than when the surface of the barrier near the sealant is perpendicular to the panel surface. Therefore, the reliability with which the sealant and the barrier are bonded to each other is increased. This can prevent the relative displacement between the first substrate and the second substrate with higher reliability. Furthermore, the width of the sealant can be reduced, resulting in a reduction in the size of a non-display region of the liquid crystal display panel which corresponds to an edge portion thereof and does not contribute to display. In summary, the liquid crystal display panel can be reduced in size.

Another preferred of the present invention provides a method for manufacturing a panel including a first substrate, a second substrate opposed to the first substrate, a sealant disposed between the first substrate and the second substrate and formed between portions of the first and second substrates located immediately outside display regions of the first and second substrates, and a liquid crystal layer disposed between the first substrate and the second substrate. The method includes the steps of forming a line exhibiting a light blocking effect on at least the portion of the first substrate; forming a light-shielding layer on the portion of the second substrate, a slit being formed in a region of the light-shielding layer coinciding with the line; applying an uncured sealant including a photocuring agent to the portion of one of the first and second substrates in loop form, dropping a liquid crystal material onto a region of the one of the first and second substrates surrounded by the uncured sealant; bonding the first and second substrates together; and applying light through both the first and second substrates to the uncured sealant to cure the uncured sealant, thereby forming the sealant. The "light" in the description of preferred embodiments of the present invention includes visible light, ultraviolet light, and X rays.

According to the method of one preferred embodiment of the present invention, in the method for manufacturing a liquid crystal panel in which a one-drop fill method is used, the sealant can be sufficiently cured only by photoirradiation. This can reduce the possibility of impurities in the sealant leaking into the liquid crystal layer as compared with when a photoreactive and heat-reactive sealant is used. In view of this, the display quality of the panel can be maintained with higher reliability, thereby ensuring the reliability of the liquid crystal panel.

According to various preferred embodiments of the present invention, uncured portions of the sealant can be reduced in area. In a case where preferred embodiments of the present invention are applied to a liquid crystal panel, the possibility of components of a sealant leaking into a liquid crystal layer can be reduced while the production cost is prevented from increasing. In view of this, excellent display quality can be maintained, thereby ensuring the reliability of the liquid crystal panel.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Hereafter, preferred embodiments of the present invention will be described. In the following preferred embodiments, a liquid crystal panel will be described as an example. However, a panel according to preferred embodiments of the present invention can be applied also to display panels other than liquid crystal display panels. More specifically, it can be applied to display elements in which optical media other than a liquid crystal material are used as display media, e.g., display panels, such as plasma display panels (PDPs), inorganic or organic electroluminescence (EL) display panels, electrochromic display (ECD) panels, and electrophoretic display panels. Furthermore, the panel according to preferred embodiments of the present invention is not limited to display panels for image display and can be applied also to panels for other purposes. For example, the present invention can be applied also to image shift panels allowing pixels to optically shift in sequence and parallax barrier panels permitting three-dimensional pictures to be displayed. The image shift panel typically has at least one combination of a liquid crystal panel for modulating the polarization of light and a birefringent element for shifting the optical path according to the polarization of light emitted from this liquid crystal panel. The parallax barrier panel is used in conjunction with an image display element having pixels for the left eye and pixels for the right eye, thereby displaying a three-dimensional image.

First Preferred Embodiment

Figures 1A, 1B, 1C:
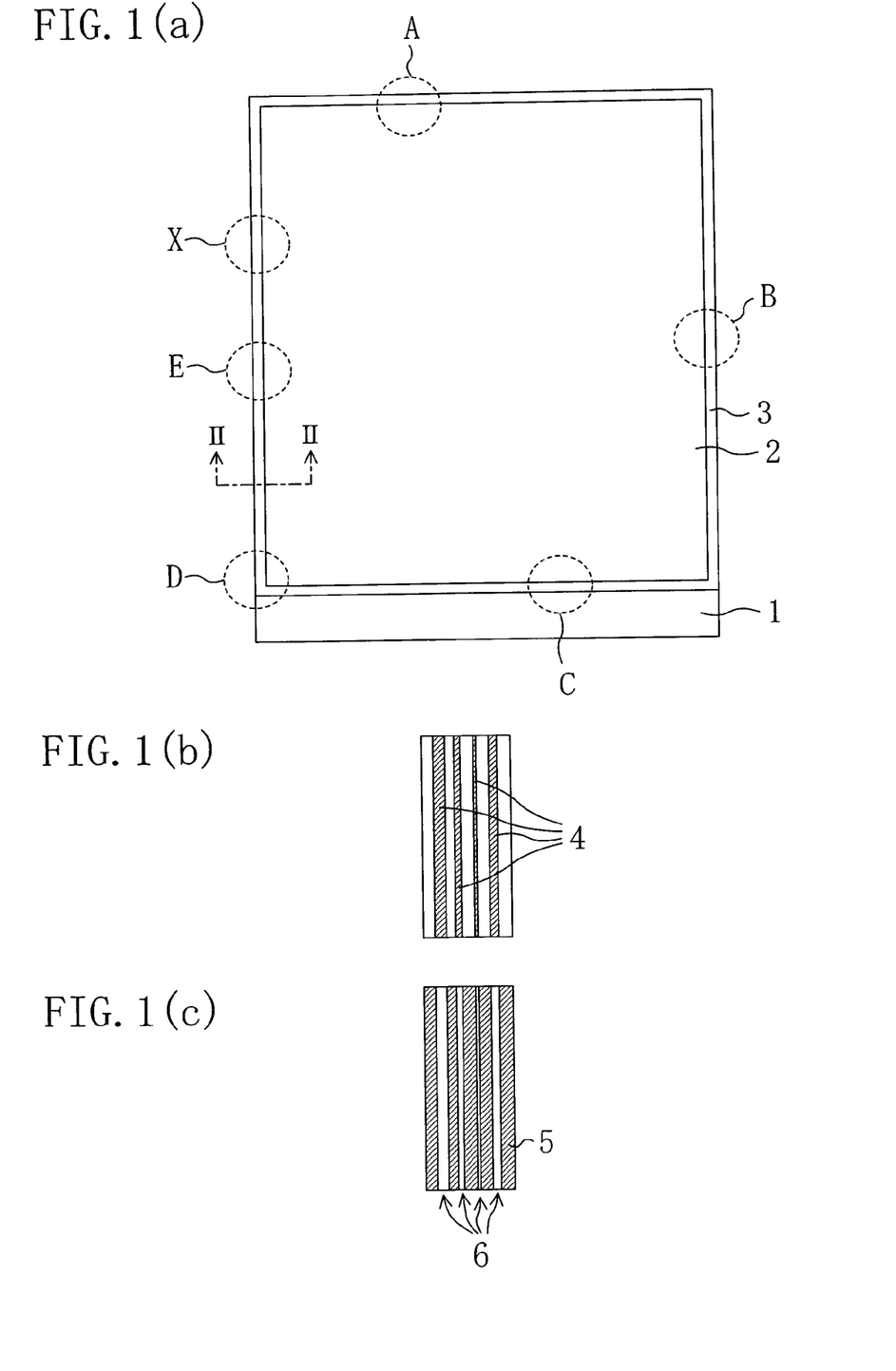
FIG. 1(a) is a plan view schematically illustrating a liquid crystal display panel according to a first preferred embodiment.
FIG. 1(b) is a schematic enlarged view of a portion of a TFT substrate surrounded by X in FIG. 1(a)
FIG. 1(c) is a schematic enlarged view of a portion of a color filter substrate surrounded by X in FIG. 1(a).
Figure 2:
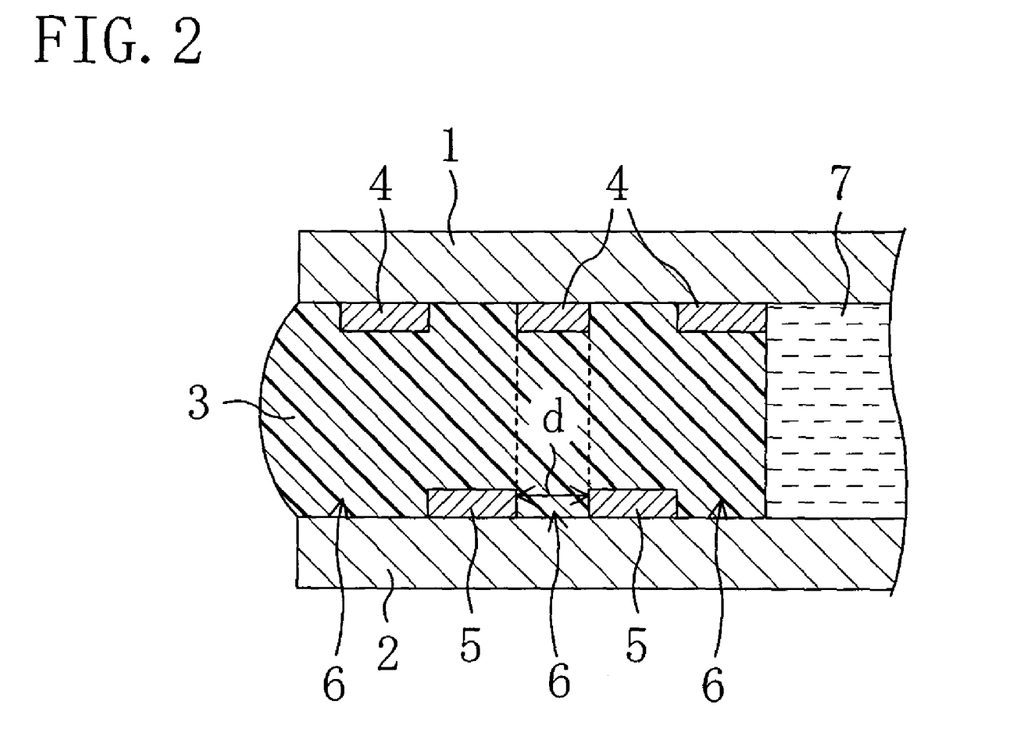
FIG. 2 is a cross-sectional view taken along the line II-II in FIG. 1(a).
Figure 3A:
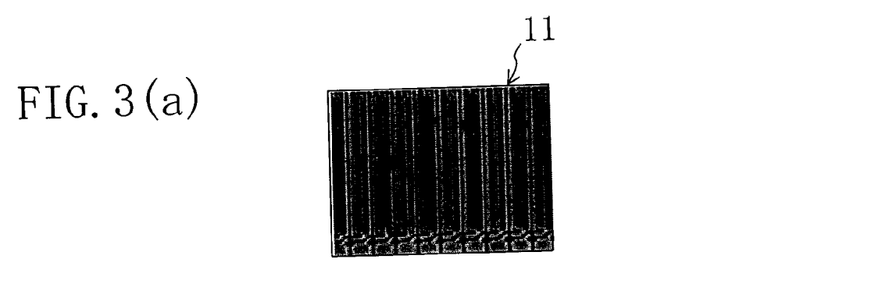
FIGS. 3(a) through 3(e) are schematic enlarged views of portions of the TFT substrate surrounded by A through E, respectively, in FIG. 1(a).
Figure 3B:
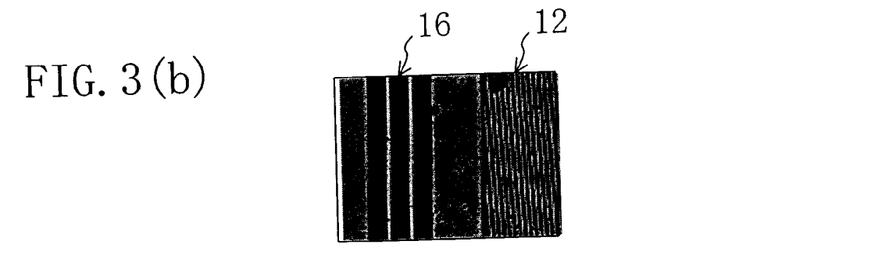
Figure 3C:
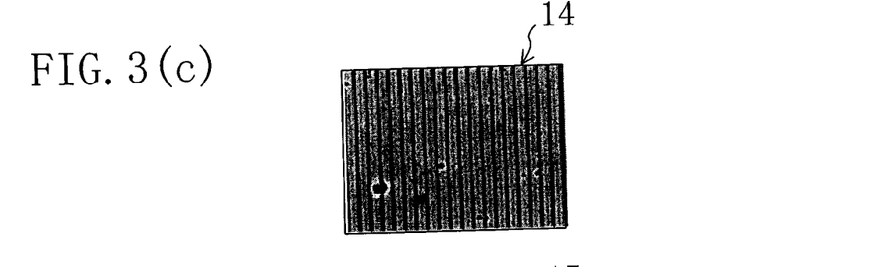
Figure 3D:
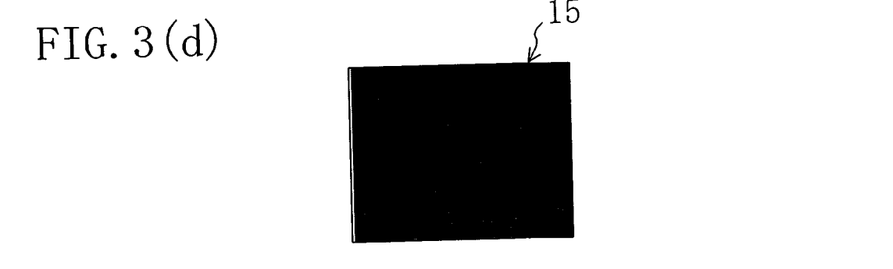
Figure 3E:
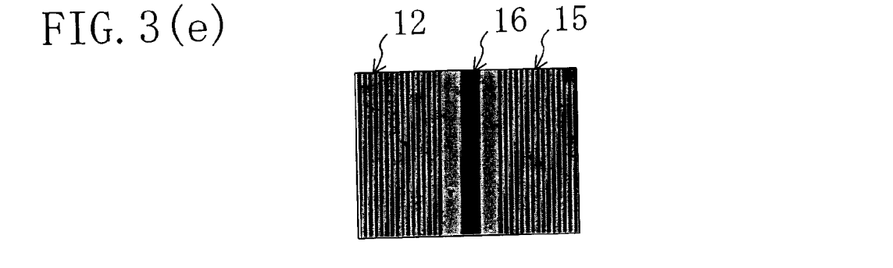

FIG. 1(a) is a plan view schematically illustrating a liquid crystal display panel according to a first preferred embodiment, FIG. 1(b) is a schematic enlarged view of a portion of a TFT substrate 1 surrounded by X in FIG. 1(a), and FIG. 1(c) is a schematic enlarged view of a portion of a color filter substrate 2 surrounded by X in FIG. 1(a). FIG. 2 is a cross-sectional view taken along the line II-II in FIG. 1(a).

The liquid crystal display panel of this preferred embodiment includes a TFT substrate 1 serving as a first substrate, a color filter (CF) substrate 2 opposed to the TFT substrate 1 and serving as a second substrate, a sealant 3 disposed between the TFT substrate 1 and the CF substrate 2 and formed between respective portions of both the substrates 1 and 2 located immediately outside display regions of the substrates 1 and 2, and a liquid crystal layer 7 disposed between the TFT substrate 1 and the CF substrate 2.

The TFT substrate 1 includes a plurality of gate bus lines (not shown) extending in the row direction, a plurality of source bus lines (not shown) crossing the gate bus lines, TFTs (not shown) provided in the vicinity of the intersections of the gate bus lines and the source bus lines, pixel transparent electrodes (not shown) connected through the TFTs to the source bus lines (not shown) and arranged in matrix form, and a liquid crystal alignment layer (not shown) covering the pixel transparent electrodes. Furthermore, terminals for inputting signals into the gate bus lines and the source bus lines and driving circuits (both not shown) are typically formed outside the sealant 3 on the TFT substrate 1.

The CF substrate 2 includes color filter layers (not shown), black matrixes formed on the borderline regions between adjacent ones of the color filter layers having respective colors, a counter common electrode made of indium tin oxide (ITO) or any other material, and a liquid crystal alignment layer (not shown) made of polyimide, polyamic acid or any other material. The liquid crystal alignment layer is normally used after rubbing treatment. However, in some cases, rubbing treatment is not carried out in the use of a vertical alignment film or in a PDLC (polymer dispersed liquid crystal) display mode.

The TFT substrate 1 and the CF substrate 2 are both optically transparent. Glass, such as quartz glass, soda lime glass, borosilicate glass, low alkali glass, or non-alkali glass, or plastic, such as polyester or polyimide, is preferably used as a material of the substrates 1 and 2.

The sealant 3 is continuously formed along the ends of the display regions of both the substrates 1 and 2 in a loop form, allows a liquid crystal material to be enclosed by bonding both the substrates 1 and 2 together and performs the function of preventing air and water outside the panel from being mixed into the liquid crystal layer 7. An ultraviolet-curable material is preferably used as the sealant 3. Used as the ultraviolet-curable material is a composite which contains a curing agent (polymerization initiator), is based on at least one of acrylic resin and epoxy resin, acrylic epoxy resin or any other material and reacts to ultraviolet light or visible light. Although the width of the sealant 3 depends on various conditions, such as the material of the sealant 3, and therefore cannot be uniquely determined, it is typically approximately 0.3 mm through approximately 3 mm, both inclusive.

The TFT substrate 1 is provided with lines 4 at a portion that is located immediately outside the display region and on which the sealant 3 is formed. The lines 4 are typically formed of an aluminum film, a titanium film, an aluminum alloy film, a molybdenum alloy film, a chromium film, or any other material, or a multilayer film of these films and provide the property of hardly transmitting light (imperviousness to light). FIGS. 3(a) through 3(e) are schematic enlarged views of portions of the TFT substrate 1 surrounded by A through E, respectively, in FIG. 1(a). In FIGS. 3(a) through 3(e), reference numeral 11 denotes circuit blocks against static electrical charge, reference numeral 12 denotes lines for the counter common electrode, reference numeral 14 denotes source bus lines, reference numeral 15 denotes gate bus lines, and reference numeral 16 denotes lines for a test. As illustrated in FIG. 3(a) through 3(e), the various lines 4 are formed on the portion that is located immediately outside the display region and on which the sealant 3 is formed. The proportion of the area occupied by the lines 4 in the area of the portion that is located immediately outside the display region and on which the sealant 3 is formed varies according to locations.

The CF substrate 2 is provided with a light-shielding layer 5 at a portion that is located immediately outside the display region and on which the sealant 3 is formed. The light-shielding layer 5 is provided, at its regions coinciding with the lines 4 on the TFT substrate 1, with slits 6. In other words, as illustrated in FIGS. 1(b) and 1(c), the light-shielding layer 5 has slits 6 to form a negative/positive relationship with the lines on the TFT substrate 1. A material of the light-shielding layer 5 is not limited and may be a resin or a metal.

The width of each of the slits 6 is preferably equal to the width d of associated one of the lines 4 on the TFT substrate 1, preferably about 5 μm or more, and more preferably about 10 μm or more. When the width of the slit 6 is less than about 5 μm and the sealant 3 is photocured by applying light through the CF substrate 2 to the sealant 3, the amount of light passing through the slit 6 is reduced. Therefore, a region of the sealant 3 associated with the slit 6 (in other words, a region of the sealant 3 associated with the associated line 4 on the TFT substrate 1) may be insufficiently cured. Meanwhile, as illustrated in FIGS. 3(a) through 3(e), the density at which the lines 4 are formed varies according to locations. In cases where the density at which the lines 4 are formed is low, the sealant 3 may be able to be sufficiently cured even under conditions in which the width d of each line 4 is less than about 5 μm and the width of associated one of the slits 6 is not equal to approximately 5 μm or more.

Since the liquid crystal display panel of this preferred embodiment is configured such that the light-shielding layer 5 is provided with slits 6 at regions coinciding with the lines 4 on the TFT substrate 1, the sealant 3 can be cured by applying light through both sides of the panel to the sealant 3. In other words, even when a photopolymerized sealant 3 is used, an uncured portion of the sealant 3 can be reduced in area. Furthermore, since a barrier does not need to be provided between the sealant 3 and the liquid crystal layer 7, this can prevent the production cost from increasing. In view of the above, excellent display quality of the liquid crystal display panel can be maintained to ensure the reliability thereof. Moreover, since lines 4 impervious to light are formed on portions of the TFT substrate 1 associated with the slits 6 of the light-shielding layer 5, this can prevent light from leaking from a light source, such as a backlight, in the use of a liquid crystal display panel.

Next, process steps for manufacturing a liquid crystal display panel according to a preferred embodiment of the present invention will be described. FIG. 4 is a cross-sectional view schematically illustrating the process steps for manufacturing the liquid crystal display panel according to the present preferred embodiment. A TFT substrate 1 can be formed by a usual method, such as photolithography. Therefore, process steps for the TFT substrate 1 will not be described.

Figure 4A:
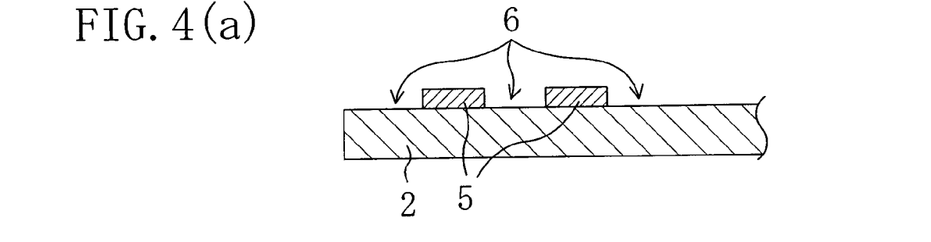
FIGS. 4(a)-4(d) are cross sectional views schematically illustrating process steps for manufacturing a liquid crystal display panel according to the first preferred embodiment of the present invention.

First, a light-shielding layer is formed, by a printing method or any other method, on a display region of a CF substrate 2, and a light-shielding layer 5 is formed, by the same method, on an edge portion (non-display region) thereof as illustrated in FIG. 4(a). The light-shielding layer (black matrix) located on the display region is formed on the border regions between adjacent ones of the color filters having respective colors. The light-shielding layer 5 on the edge portion is provided, at its regions coinciding with lines 4 on the TFT substrate 1, with slits 6. The light-shielding layer 5 may be formed simultaneously with the light-shielding layer (black matrix) on the display region. Furthermore, a counter common electrode (not shown) and a liquid crystal alignment layer made of polyimide or any other material are sequentially formed, and then the liquid crystal alignment layer is rubbed.

Figure 4B:
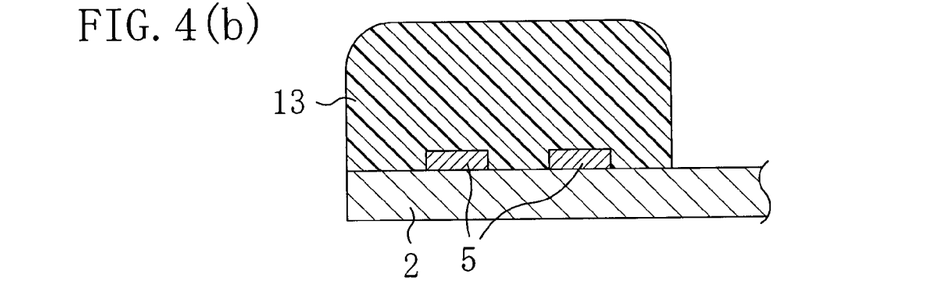

As illustrated in FIG. 4(b), the portion of the CF substrate 2 located immediately outside the display region is coated, by a screen printing method or a dispenser method, with an uncured sealant 13 which is curable by ultraviolet and contains an acryl resin or an epoxy resin. The pattern of the uncured sealant 13 is preferably in the form of a loop (closed frame) that does not have any opening functioning as a liquid crystal inlet. In a case where a sealant that will be progressively cured with visible light is used instead of an ultraviolet-curable sealant, the subsequent step of applying ultraviolet light to the sealant is changed to the step of applying visible light to the sealant.

Figure 4C:
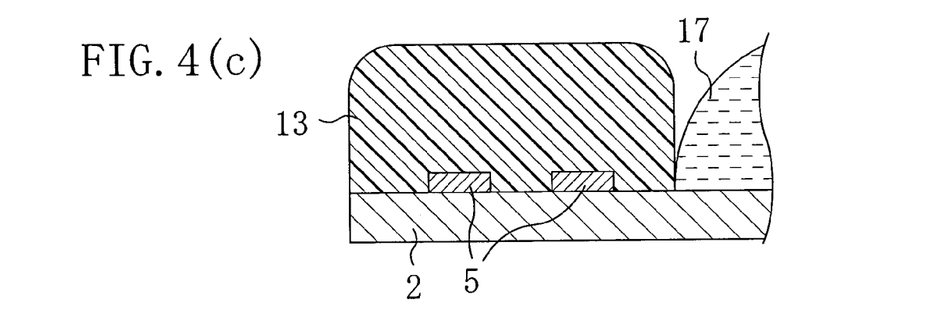

As illustrated in FIG. 4(c), for example, a liquid crystal material 17 is dropped onto a region of the CF substrate 2 surrounded by the uncured sealant 13. The liquid crystal material 17 is enclosed in the panel by placing the substrates 1 and 2 one above the other in a vacuum chamber, thereby forming a liquid crystal layer 7 (see FIG. 4(d)).

Figure 4D:
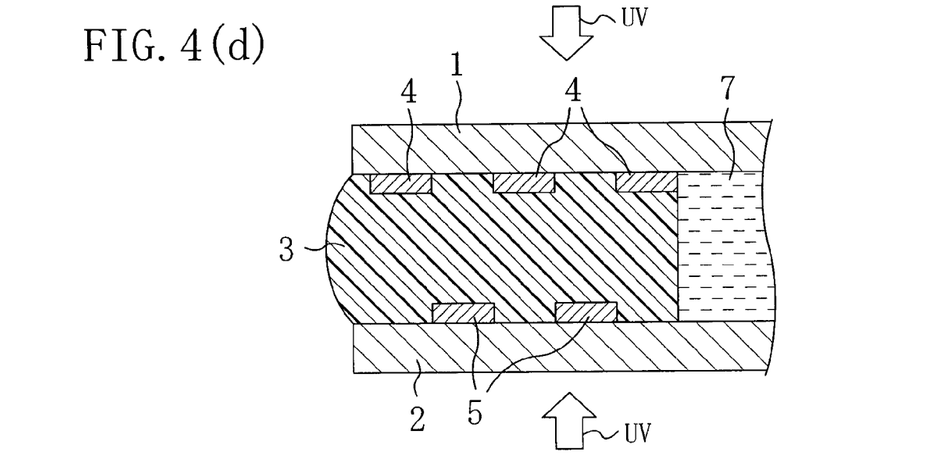

As illustrated in FIG. 4(d), ultraviolet (UV) light is applied through both the TFT substrate 1 and the CF substrate 2 to the uncured sealant 13. The ultraviolet (UV) light applied through the TFT substrate 1 does not enter into portions of the uncured sealant 13 located under the lines 4 for the TFT substrate 1. However, since the light-shielding layer 5 on the CF substrate 2 is provided, at its regions associated with the lines 4, with the slits 6, the ultraviolet (UV) light applied through the CF substrate 2 enters into the uncured sealant 13. Thus, ultraviolet (UV) light enters through the gaps between adjacent ones of the lines 4 on the TFT substrate 1 and the slits 6 of the light-shielding layer 5 on the CF substrate 2 into the sealant 13, and consequently curing of the uncured sealant 13 proceeds. This can reduce the area of an uncured portion of a resultant sealant 3. A liquid crystal display panel of this preferred embodiment is manufactured through the above-mentioned process steps.

Ultraviolet light may be applied through one of the TFT substrate 1 and the CF substrate 2 to the sealant 13 after being applied through the other one of the TFT substrate 1 and the CF substrate 2 to the sealant 13. Alternatively, ultraviolet light may be simultaneously applied through both the substrates 1 and 2 to the sealant 13. However, it is preferable that ultraviolet light is simultaneously applied through both the substrates 1 and 2 to the sealant 13 in order to shorten the period during which the uncured sealant 13 is in contact with the liquid crystal layer 7 as much as possible and reduce the possibility of components of the uncured sealant leaking into the liquid crystal layer 7.

Although in this preferred embodiment ultraviolet light is applied through both the TFT substrate 1 and the CF substrate 2 to the sealant 13, ultraviolet light may be applied only through the CF substrate 2 thereto. For example, in cases lines 4 are formed on a region of the TFT substrate 1 associated with the sealant 3 at high density, the area occupied by gaps between adjacent ones of the lines 4 is small. Therefore, even when ultraviolet light is applied through the TFT substrate 1 to the sealant 13, polymerization of the uncured sealant 13 can be hardly expected. In such cases, the sum of the areas of portions of the CF substrate 2 occupied by the slits 6 of the light-shielding layer 5 is large. For this reason, the application of ultraviolet light through the CF substrate 2 to the sealant 13 allows the uncured sealant 13 to be mostly cured.

Furthermore, although in this preferred embodiment a panel preferably is formed using a TFT substrate 1 and a CF substrate 2, it may be formed using a TFT substrate having color filters and a counter substrate. In this case, the counter substrate is provided with a light-shielding layer, at a portion that is located immediately outside its display region and on which a sealant is formed, and the light-shielding layer is provided, at its regions coinciding with lines on the TFT substrate, with slits.

Second Preferred Embodiment

Figure 5:
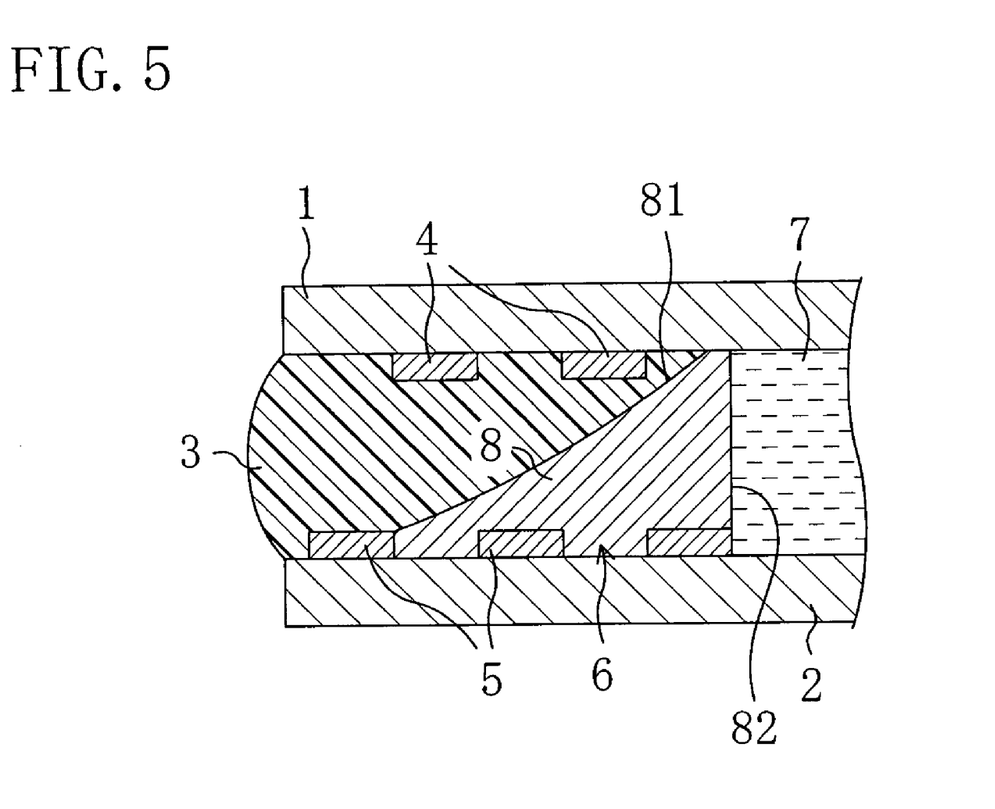
FIG. 5 is a schematic cross-sectional view of a portion of a liquid crystal display panel located in the vicinity of one end of a display region of the panel according to a second preferred embodiment of the present invention.

FIG. 5 is a schematic cross-sectional view of a portion of a liquid crystal display panel located in the vicinity of one end of a display region of the panel according to a second preferred embodiment. In the subsequent drawings, components having substantially the same functions as the components of the liquid crystal display panel of the first preferred embodiment are denoted by the same reference numerals, and thus description thereof will be omitted.

The liquid crystal display panel of this preferred embodiment further includes a barrier 8 continuously formed inside a loop-like sealant 3 (on the side of the sealant 3 near a liquid crystal layer 7) so as to extend along the sealant 3. The liquid crystal layer 7 is surrounded by the barrier 8.

The barrier 8 has an inclined surface 81 near the sealant 3 and a side surface 82 near the liquid crystal layer 7 and is preferably formed of an optically transparent material. For example, a photopolymerized organic material, such as acrylic resin, polyimide resin or epoxy resin, or an inorganic material, such as silicon dioxide, is preferably used as a material of the barrier 8. The same kind of material as that used for the sealant 3 may be used to form a barrier 8. This can increase the reliability with which the sealant 3 and the barrier 8 are bonded to each other.

The barrier 8 can be formed by a usual method, such as photolithography. A method in which a barrier 8 is formed by photolithography will be described as an example. First, a film-like solder resist or a dry film is thermal compression bonded onto a CF substrate 2 by a laminator. Alternatively, a liquid solder resist may be uniformly applied to the entire surface of the CF substrate 2 by a spin coating method, a slit coating method, a slit and spin coating method, a screen printing method, a spray coating method, a curtain coating method, or any other method and then may be pre-baked by a hot plate or an oven. Subsequently, a photomask is laid over the solder resist or the dry film formed on the CF substrate 2, and then the solder resist or the dry film is exposed to ultraviolet light or visible light to form a desired pattern. An unnecessary portion of the solder resist or the dry film is removed by development, and the remaining portion thereof is post-baked by a hot plate or an oven, thereby forming a barrier 8.

A gradation sequence photomask including a light-shielding portion, the transmittance of a portion of which is successively changed is used in the exposure to light, thereby forming an inclined surface 81. More specifically, in a case where a negative solder resist or a negative dry film is used, a gradation sequence photomask is used in which the ultraviolet transmittance successively decreases outward within a region of the photomask associated with the inclined surface 81. A gradation sequence photomask has been disclosed in Japanese Unexamined Patent Application Publication No. 2002-229040.

Alternatively, an inclined surface 81 of the barrier 8 may be formed by changing the light exposure (time, illuminance) and the development conditions (the developer concentration, the developer temperature, and the developing time). Furthermore, in a case where a barrier 8 is formed using an inorganic material, silicon dioxide or any other material may be deposited on the CF substrate 2 with a deposition mask disposed therebetween. This deposition can include generally-known various methods, such as sputtering or EB (electron beam) deposition. The inclined surface 81 may be formed by shifting deposition masks during the deposition.

In the liquid crystal display panel of this preferred embodiment, the presence of a barrier 8 between a sealant 3 and a liquid crystal layer 7 can prevent uncured components of the sealant 3 from leaking into the liquid crystal layer 7. Since the surface 81 of the barrier 8 near the sealant 3 is inclined, the area of contact between the barrier 8 and the sealant 3 is large. This can prevent the relative displacement between a TFT substrate 1 and a CF substrate 2 with higher reliability. In this way, the width of the sealant 3 can be shortened, resulting in a liquid crystal display panel that has greatly reduced size.

Next, process steps for manufacturing a liquid crystal display panel according to a preferred embodiment of the present invention will be described. FIG. 6 are cross-sectional views schematically illustrating the process steps for manufacturing a liquid crystal display panel according to the present preferred embodiment. A TFT substrate 1 can be formed by a usual method, such as photolithography or printing, and a CF substrate 2 can be formed by the method described in the first preferred embodiment. Thus, description of process steps for manufacturing these substrates will be omitted.

Figure 6A:
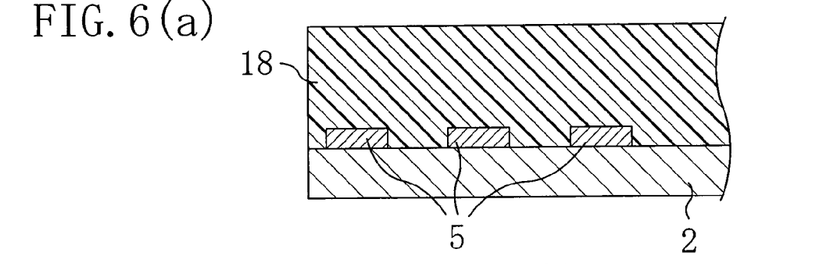
FIGS. 6(a)-6(d) are cross sectional views schematically illustrating process steps for manufacturing a liquid crystal display panel according to the second preferred embodiment of the present invention.

First, as illustrated in FIG. 6(a), a liquid photosensitive acrylic resin is applied onto a CF substrate 2 by screen printing and dried, thereby forming a photosensitive resin 18. The photosensitive resin 18 is patterned by photolithography using a gradation sequence photomask. In this way, an optically transparent loop barrier 8 is formed in the vicinity of the edge of the CF substrate 2 (see FIG. 6(b)).

Figure 6B:
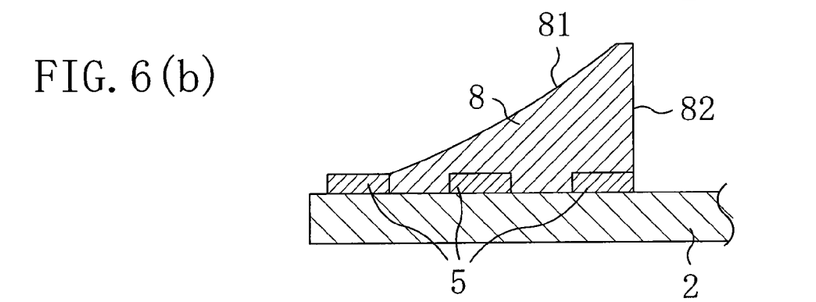

When both the substrates 1 and 2 are placed one above the other, the barrier 8 is slightly squeezed. For this reason, the height of the barrier 8 is preferably set at the value obtained by adding the expected amount of reduction in the height of the barrier 8 due to the above-mentioned squeeze (approximately 0.2 μm) to the cell gap. In a case where a liquid crystal display panel includes a columnar spacer, the columnar spacer is formed simultaneously with the formation of the barrier 8, thereby simplifying the manufacturing process steps.

Figure 6C:
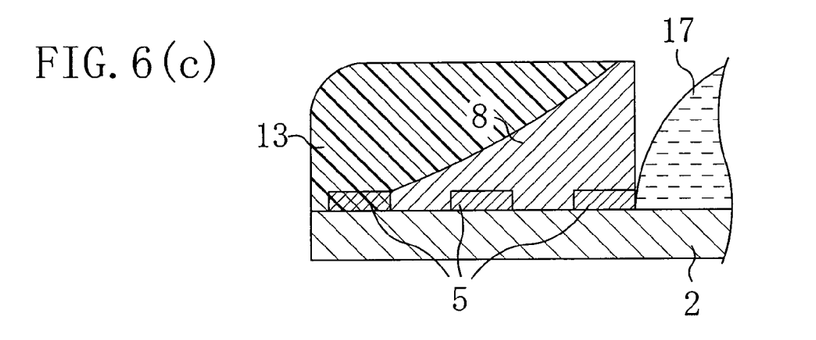

As illustrated in FIG. 6(c), an uncured sealant 13 which is curable by ultraviolet and contains an acryl resin or an epoxy resin is applied to a portion of the CF substrate 2 located immediately outside a display region of the CF substrate 2 by a screen printing method or a dispenser method to cover an inclined surface 81 of the barrier 8. The pattern of the uncured sealant 13 is in the form of a loop (closed frame) that does not have any opening serving as a liquid crystal inlet. Since the outer surface 81 of the barrier 8 is inclined, this makes it difficult to mix air bubbles into the uncured sealant 13 during the application of the uncured sealant 13 to the inclined surface 81. In particular, an empty space is hardly formed between the inclined surface of the barrier 8 and the uncured sealant 13.

After the application of the uncured sealant 13, for example, a liquid crystal material 17 is dropped onto a region of the CF substrate 2 surrounded by the barrier 8. Both the substrates 1 and 2 are placed one above the other under a reduced pressure in a vacuum chamber, thereby enclosing the liquid crystal material 17 in the panel. As a result, a liquid crystal layer 7 is formed (see FIG. 6(d)).

Figure 6D:
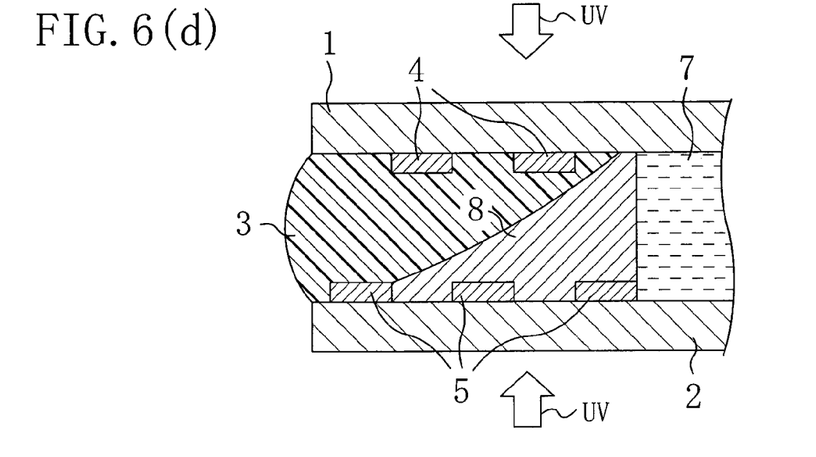

As illustrated in FIG. 6(d), ultraviolet (UV) light is applied through both the TFT substrate 1 and the CF substrate 2 to the barrier 8 and the uncured sealant 13. The barrier 8 is optically transparent, and a light-shielding layer 5 on the CF substrate 2 is provided, at its regions corresponding to lines 4, with slits 6. Therefore, the ultraviolet light applied through the CF substrate 2 enters into the uncured sealant 13. Thus, ultraviolet light enters through the spaces between adjacent ones of the lines 4 on the TFT substrate 1 and the slits 6 on the CF substrate 2 into the uncured sealant 13. Consequently, curing of the uncured sealant 13 proceeds, resulting in a reduction in the area of an uncured portion of a resultant sealant 3. Ultraviolet light entering through the CF substrate 2 into the bottom of the barrier 8 is partially emitted through the inclined surface 81 of the barrier 8. For this reason, curing of the uncured sealant 13 proceeds also from portion thereof near the inclined surface 81. This reduces the amount of uncured components of the sealant 3 and increases the reliability with which both the substrates 1 and 2 are bonded to each other by the sealant 3. The liquid crystal display panel of this preferred embodiment is manufactured through the above-described process steps.

Light to be applied to the sealant 13 having a wavelength allowing the uncured sealant 13 to be cured, is not limited to ultraviolet light and may be, for example, visible light or X rays. When ultraviolet light is applied to the uncured sealant 13, ultraviolet light is preferably applied through a photomask for shading a display region of the CF substrate 2 thereto in order to prevent ultraviolet light from being applied to a liquid crystal display portion of the panel.

Although in this preferred embodiment the barrier 8 is preferably formed on the CF substrate 2, a barrier 8 may be formed not on the CF substrate 2 but on the TFT substrate 1.

Furthermore, although in this preferred embodiment the uncured sealant 13 is applied onto the CF substrate 2, an uncured sealant 13 may be applied onto the TFT substrate 1. Moreover, although the panel is preferably formed using the TFT substrate 1 and the CF substrate 2, a panel may be formed using a TFT substrate having color filters and a counter substrate.

Although the preferred embodiments of the present invention have been described above, the technical scope of the present invention is not limited to the scope of the description of these preferred embodiments. The above-described preferred embodiments are by way of example, and it will be understood by those skilled in the art that various changes may be made to elements and the combination of processes and such modifications also fall within the scope of the present invention.

Although in the first and second preferred embodiments, for example, TFTs preferably are used as liquid crystal driving elements, other active driving elements, such as MIM (metal insulator metal), may be used. Alternatively, a passive (multiplex) driving mode in which driving elements are not used may be used. A liquid crystal display panel may be transmissive, reflective or transflective.

The panel according to various preferred embodiments of the present invention can be utilized as a liquid crystal display panel, a PDP, an inorganic or organic EL display panel, an ECD panel, an electrophoretic display panel, or any other panel but is not limited to display panels and can be further utilized as an image shift panel, a parallax barrier panel or any other panel. More specifically, it can be utilized for cell phones, PDA (personal digital assistance), personal computers, thin television sets, displays for medical use, car navigation systems, amusement devices, and other purposes.

While preferred embodiments of the present invention have been described above, it is to be understood that variations and modifications will be apparent to those skilled in the art without departing the scope and spirit of the present invention. The scope of the present invention, therefore, is to be determined solely by the following claims.

The invention claimed is:

1. A panel comprising:
   a first substrate;
   a second substrate opposed to the first substrate; and
   a sealant disposed between the first substrate and the second substrate and disposed between portions of the first and second substrates located immediately outside display regions of the first and second substrates; wherein
   at least the portion of the first substrate is provided with a plurality of spaced wires arranged in a non-uniform manner and exhibiting a light blocking effect;
   the portion of the second substrate is provided with a light-shielding layer; and
   the light shielding layer is provided with a plurality of slits in one-to-one correspondence with the plurality of spaced wires so that portions of the sealant coinciding with the plurality of spaced wires are entirely irradiated with light.

2. The panel of claim 1, further comprising a liquid crystal layer disposed between the first substrate and the second substrate.

3. The panel of claim 2, wherein the sealant has a loop configuration.

4. The panel of claim 1, wherein the sealant is made of a composite containing a photocuring agent.

5. The panel of claim 2, further comprising a barrier arranged inside the sealant and so as to extend along the sealant, and the surface of the barrier near the sealant is inclined relative to the surfaces of the first and second substrates.

6. A method for manufacturing a panel including a first substrate, a second substrate opposed to the first substrate, a sealant disposed between the first substrate and the second substrate and disposed between portions of the first and second substrates located immediately outside display regions of the first and second substrates, and a liquid crystal layer disposed between the first substrate and the second substrate, said method comprising the steps of:
   forming a plurality of spaced wires arranged in a non-uniform manner and exhibiting a light blocking effect on at least the portion of the first substrate;
   forming a light-shielding layer on the portion of the second substrate, where the light-shielding layer is provided with a plurality of slits in one-to-one correspondence with the plurality of spaced wires so that portions of the sealant coinciding with the plurality of spaced wires are entirely irradiated with light;
   applying an uncured sealant containing a photocuring agent to the portion of one of the first and second substrates in loop form;
   dropping a liquid crystal material onto a region of said one of the first and second substrates surrounded by the uncured sealant;
   bonding the first and second substrates together; and
   applying light through both the first and second substrates to the uncured sealant to cure the uncured sealant, thereby forming the sealant.

* * * * *

UNITED STATES PATENT AND TRADEMARK OFFICE
CERTIFICATE OF CORRECTION

| | | |
|---|---|---|
| PATENT NO. | : 7,880,854 B2 | |
| APPLICATION NO. | : 11/813534 | |
| DATED | : February 1, 2011 | |
| INVENTOR(S) | : Masahiko Kondo et al. | |

It is certified that error appears in the above-identified patent and that said Letters Patent is hereby corrected as shown below:

Item (86) PCT No. on the cover page of the Patent, the PCT number should be corrected to:

PCT/JP2006/305588

Signed and Sealed this
Twenty-sixth Day of April, 2011

David J. Kappos
*Director of the United States Patent and Trademark Office*